July 28, 1959  F. E. CUNNINGHAM  2,896,966
ANTI-TILT ATTACHMENT FOR TRACTORS
Filed June 12, 1958  2 Sheets-Sheet 1
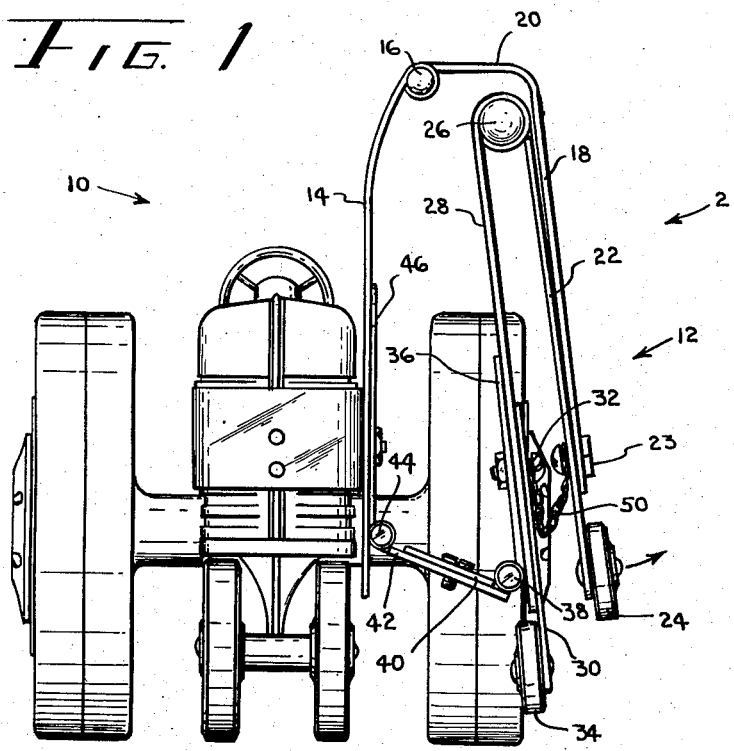
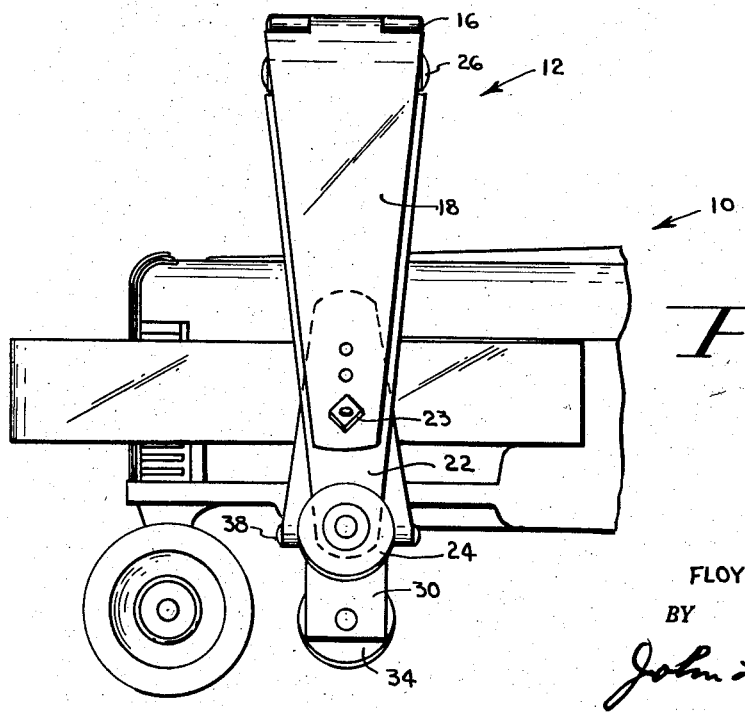
INVENTOR.
FLOYD E. CUNNINGHAM
BY
John L. Woodward
ATTORNEY July 28, 1959  F. E. CUNNINGHAM  2,896,966
ANTI-TILT ATTACHMENT FOR TRACTORS
Filed June 12, 1958  2 Sheets-Sheet 2
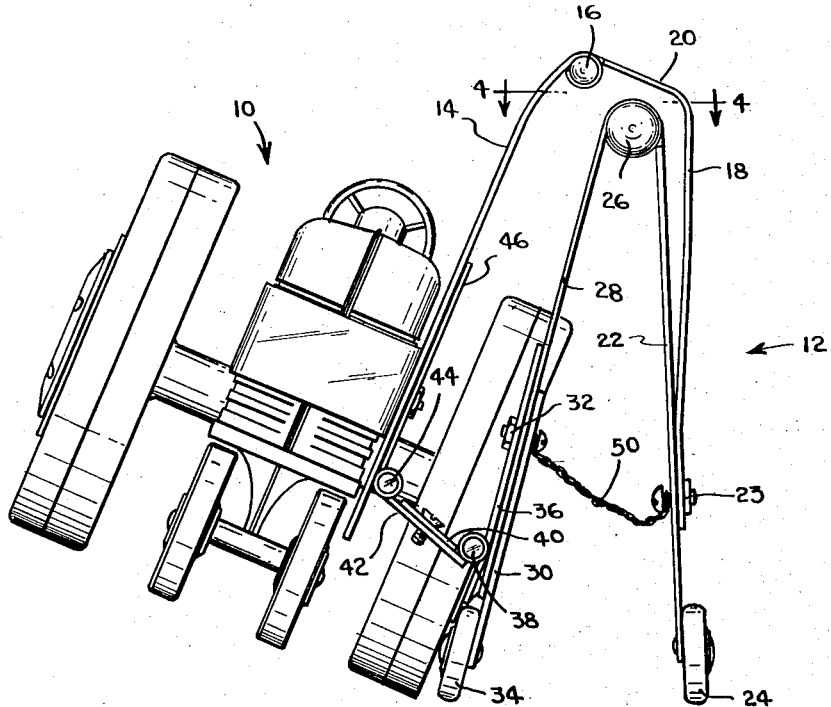
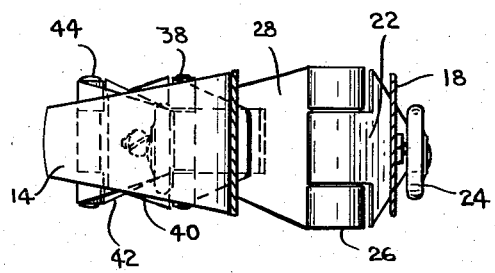
INVENTOR.
FLOYD E. CUNNINGHAM
BY
John L. Woodward
ATTORNEY

United States Patent Office 2,896,966
Patented July 28, 1959

2,896,966

ANTI-TILT ATTACHMENT FOR TRACTORS

Floyd E. Cunningham, Minneapolis, Minn.

Application June 12, 1958, Serial No. 741,502

8 Claims. (Cl. 280—150)

This invention relates to devices for preventing the accidental upsetting of a vehicle during use, particularly when working on the sides of hills.

Heretofore the attachments for vehicles, such as tractors, to prevent them from tipping over during use, utilized wheeled outriggers which required the operator to actuate some element before the attachment would operate to prevent the tractor from being upset.

My attachment comprises mechanical means which is automatically actuated when the tractor starts to tilt and which means prevents the tractor being upset. The attachment comprises a first member which is secured in a vertical position on a side of the tractor. A second member pivotally connected to the top of the first member and consists of a depending portion and an upstanding portion which extends upwardly inside the depending portion of the second member. A wheel is carried by the lower end of the depending portion of the second member for engaging the ground upon the tractor being tilted. The upper end of the upstanding portion of the second member is pivotally mounted to a pin arjacent the top of the depending portion of the second member. A third member is pivotally carried by the first pin and extends downwardly below the lower end of the second member and a wheel is carried on the lower end of the third member. A fourth member or leg is detachably secured to the third member intermediate its ends. The lower end of the fourth member is pivotally mounted on a second pin adjacent the lower end of the third member. A lateral member or arm is pivotally mounted on the second pin at its outer end and its inner end is pivotally mounted on a third pin adjacent the lower end of the first member or leg. A fifth member or leg is mounted on the third pin and the fifth member is secured to the first member.

It is an object of this invention to provide in an attachment for tractors which will automatically be actuated upon the tractor being tilted to prevent the tractor being upset during use.

It is another object of this invention to provide in an attachment for tractors for preventing the tractor from tilting over which is normally held in inoperative position but which is rendered automatically operable when the tractor is tilted.

With these and other objects in view, the invention resides in certain novel construction and combination and arrangement of parts, the essential features of which are particularly pointed out in the appended claims, and are illustrated in the accompanying drawings in which:

Figure 1 is a front elevational view of a tractor, disclosing the side of an anti-tilt attachment secured to a side thereof.

Figure 2 is a side elevational view of a tractor, parts broken away, disclosing the front of the anti-tilt attachment in inoperative position.

Figure 3 is a front elevational view of a tractor in tilted position and a side view of the anti-tilt attachment in operative position.

Figure 4 is a sectional view taken on line 4—4 of Figure 3 disclosing parts of the anti-tilt attachment.

Referring more particularly to the drawings, 10 designates a conventional tractor. The anti-tilt attachment 12 comprises a first member or leg 14 secured to the side of the tractor extending vertically thereof. The lower end of leg 14 is spaced above the ground and its upper end extends above the top of the tractor 10. The upper end of the leg 14 is bent slightly outwardly and is mounted on a pin 16. A second member or leg 18 has its upper end hinged on the pin 16 and it extends substantially horizontally for a relatively short distance as at 20, and then extends downwardly. A third member or leg 22 is secured by fastening means 23 to the lower end of leg 18 and extends upwardly inside leg 18 to adjacent the top portion 20 of leg 18. The lower end of leg 22 extends below the lower end of leg 18 and carries an axle upon which is journalled a wheel 24. The upper end of member 22 is pivotally mounted on a pin 26. Legs 18 and 22 may be formed integral and serve as a single member.

A member or leg 28, the upper end of which is pivotally mounted on pin 26 extends downwardly and slightly outwardly from the tractor 10. An extension 30 is secured by fastening means 32 to leg 28 and carries an axle upon which a wheel 34 is journalled. A member or leg 36 is detachably secured by fastening means 32 to the leg 28. A series of vertical spaced holes are provided in leg 28 so that leg 36 may be secured in different vertical positions. The lower end of the leg 36 is pivotally mounted on a pin 38 adjacent the lower end of leg 28. A lateral arm 40 is pivotally mounted at its outer end on pin 38. A second lateral arm 42 is pivotally carried on a pin 44 at its inner end which is adjacent the lower end of leg 14. The arms 40 and 42 are secured together by a screw means. A leg 46 is secured to the leg 14 and its lower end is mounted on pin 44.

In Figure 1, the anti-tilt attachment 12 is shown in inoperative position. The tractor 10 is on level ground in Figure 1 and in such a position both wheels 34 and 24 are out of engagement with the ground, but wheel 34 on leg 28 is closer to the ground than wheel 24 on leg 18. As long as the tractor operates on level or substantially level ground, the anti-tilt attachment 12 will remain in the position as shown in Figures 1 and 2 of the drawing.

If the tractor 10 should be used to travel over uneven ground as on the side of a hill, see Figure 3, the tractor 10 tilts over, and as the tractor 10 tilts over on the side of the tractor on which the attachment 12 is mounted, wheel 34 on leg 28 engages the ground and thus leg 28 is moved upwardly which pivots arms 40 and 42 on pins 38 and 44 respectively and also swings legs 22 and 18 outwardly and wheel 24 will engage the ground and prevents the tractor 19 from upsetting. A chain 50 is connected between legs 22 and 28 to prevent leg 22 being swung outwardly too far from the tractor 10.

It can be seen that my anti-tilt attachment 12 will remain in inoperative position and out of contact with the ground as long as the tractor 10 remains substantially level, but as soon as the tractor 10 starts to tilt over and is about to be upset, the wheel 34 on leg 28 engages the ground and automatically swings leg 22 outwardly so that wheel 24 engages the ground, preventing the tractor over-turning and thus preventing injury to the operator of the tractor.

The attachment 12 may be fastened to either the sides or rear of the tractor 10.

From the foregoing, it will be seen that a novel and advantageous construction has been described for attaining the desired ends, and while there is herein shown and described the preferred embodiment of the invention, it is nevertheless to be understood that changes may be made therein without departing from the spirit and scope of the invention, as claimed.

I claim:

1. An anti-tilting attachment for a tractor comprising a frame consisting of a first upright member secured to a side portion of the tractor frame, a depending member hinged adjacent the top of the upright member, a second upright member secured to the depending member adjacent to its lower end and extending upwardly adjacent the inside of the first depending member to adjacent the top of the first depending member, a first pin pivotally mounting the upper end of the second upright member, a second depending member having its upper end pivotally mounted on said first pin, a third depending member secured intermediate the ends of the second depending member, a second pin pivotally mounting the lower end of the third depending member, a lateral member having its outer end pivotally mounted on said second pin, the inner end of the lateral member pivotally mounted on a third pin means secured adjacent the lower end of the said first upright member, the second of said depending members having its lower end extending below the lower end of the second upright member whereby upon the tractor being tilted on the side upon which the anti-tilt frame is mounted, the lower end of said second depending member engages the ground and the said second depending member is moved upwardly and the lateral member is pivoted upwardly on the said second and third pins thereby swinging the second upright member outwardly on said first pin whereby the lower end of the said second upright member engages the ground thus preventing the tractor from tilting over.

2. In an anti-tilting attachment for a tractor as set forth in claim 1 wherein a wheel is mounted on the lower ends of the said second depending member and said second upright member for engaging the ground upon the tractor being tilted.

3. In an anti-tilting attachment for a tractor as set forth in claim 1 wherein the said third depending member is detachably secured to the second depending member at different vertical positions.

4. In an anti-tilting attachment for tractors as set forth in claim 1 wherein a means is connected between the second upright member and the second depending member for regulating the outwardly swinging movement of said second upright member when the tractor is tilted.

5. In an anti-tilting attachment for tractors comprising a frame consisting of a first member secured to a side portion of the tractor frame and extending vertically of the tractor, a second member being pivotally mounted adjacent the top of the first member, the second member having a portion extending downwardly and a portion extending upwardly inside its downward portion to adjacent the top of the said downward portion, a pin pivotally mounting the top of the upwardly extending portion of the said second member, and a third member having its upper end pivotally carried on the pin, the lower end of the third member extending below the lower end of the second member whereby upon the tractor being tilted on the side upon which the anti-tilting frame is mounted the lower end of the third member engages the ground thereby pivoting the second member outwardly from the side of the tractor whereby the lower end of the second member engages the ground thus preventing the tractor from tilting over.

6. In an anti-tilting attachment for tractors as set forth in claim 5 wherein a wheel is carried on the lower ends of the second and third members, and wherein means is connected between the second and third members to regulate the outwardly swinging movement of the second member.

7. In an anti-tilting attachment for tractors comprising a frame consisting of a first member secured to a side of the tractor and extending vertically of the tractor, a second member having a depending portion the upper end of which is pivotally mounted to the upper end of the first member, the second member provided with an upwardly extending portion which extends inside the depending portion of the second member to adjacent the top of the depending portion of the second member, a pin pivotally mounting the upper end of the upwardly extending portion of the second member, a third member having its upper end pivotally mounted on said first pin extending downwardly and its lower end extending beyond the lower end of the second member, a wheel carried on the lower ends of the second and third members for engaging the ground upon the tractor being tilted, a lateral member pivotally connected between the first and third members adjacent their lower ends, and upon the tractor being tilted on the side upon which the anti-tilt frame is mounted, the wheel on the third member engages the ground and said third member moves upwardly pivoting the lateral member upwardly and pivoting the second member outwardly on the said pin whereby the wheel on the second member engages the ground thus preventing the tractor from tilting over.

8. In an anti-tilting attachment for tractors as set forth in claim 7 wherein means are connected between the second and third members for controlling the length of the outwardly swinging movement of the second member upon the wheel on the third member engaging the ground when the tractor is tilted.

No references cited.